Patented June 21, 1938

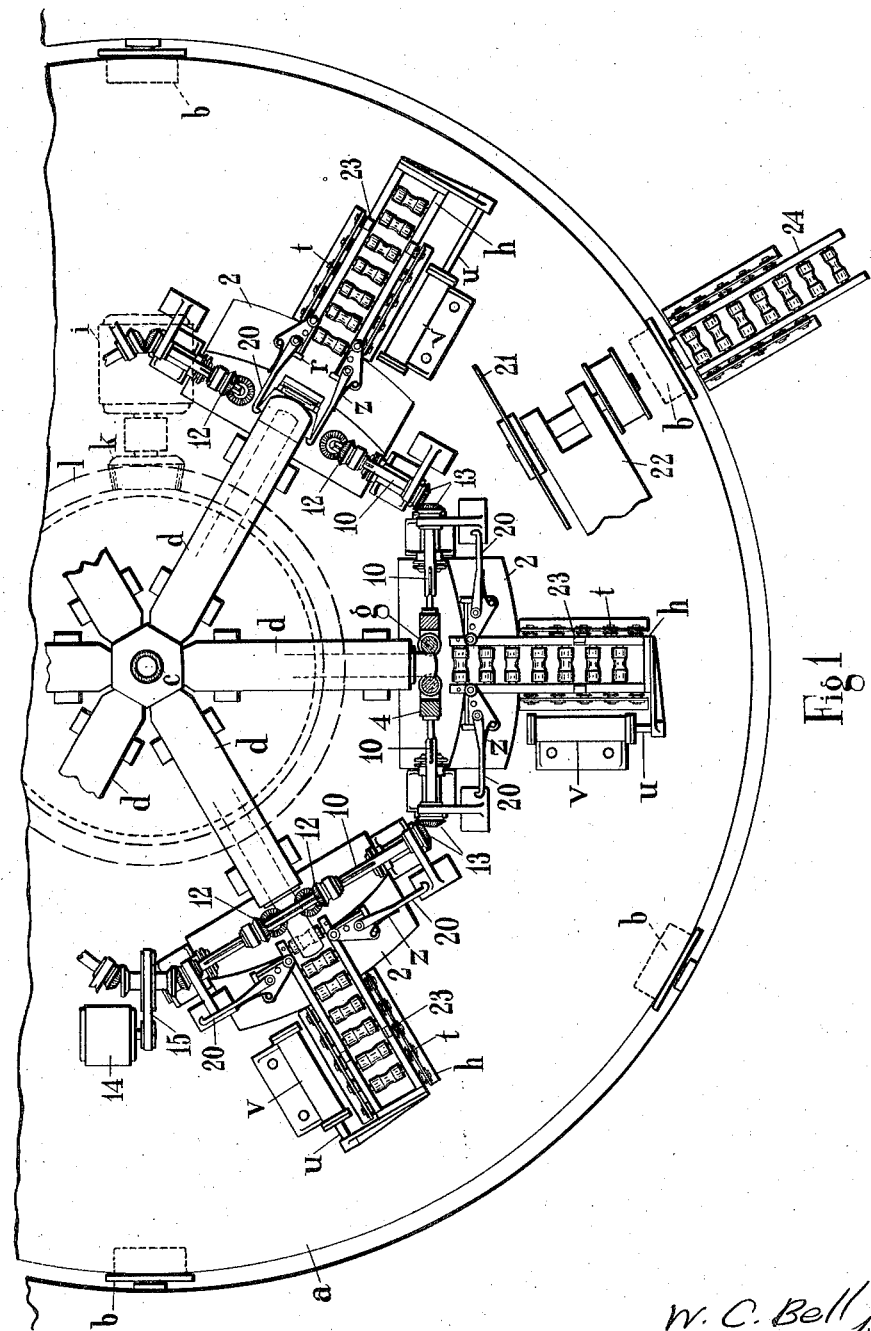

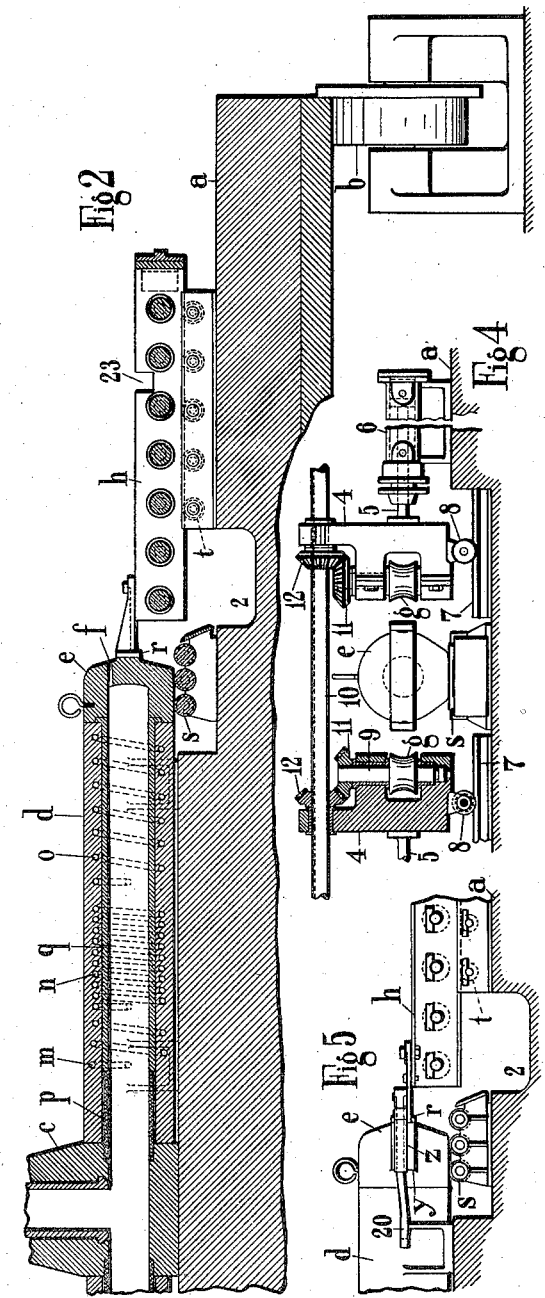

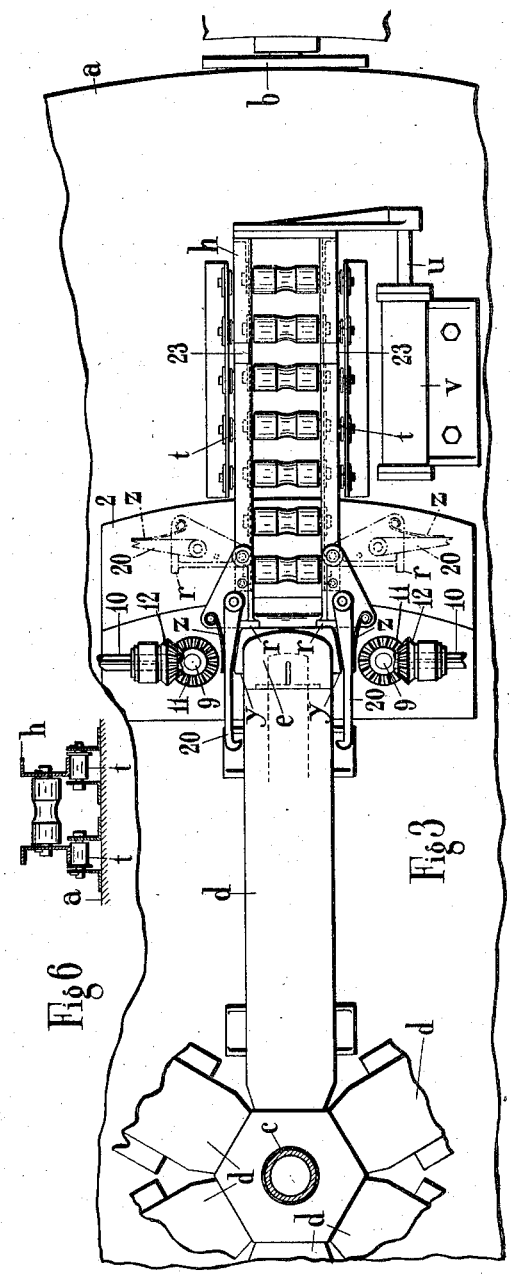

2,121,280

UNITED STATES PATENT OFFICE 2,121,280

MANUFACTURE OF STEEL OR OTHER METAL BILLETS, BARS, OR THE LIKE

William Charles Bell, Wolverhampton, England, assignor to Stewarts and Lloyds Limited, Glasgow, Scotland Application March 29, 1937, Serial No. 133,693
In Great Britain April 6, 1936

6 Claims. (Cl. 22—57.2)

This invention has for its object to provide an improved means for continuously producing cast steel or other metal billets, bars or the like.

Referring to the accompanying sheets of explanatory drawings:—

Figure 1 is a plan of a continuous casting machine constructed and adapted to operate in accordance with this invention.

Figure 2 is a longitudinal section illustrating one of a plurality of similar moulds with its removable end cap, billet-supporting carriage, and hydraulic actuating means for the carriage.

Figure 3 is a plan of the apparatus shown in Figure 2 and also withdrawing rollers which act on the billet.

Figure 4 is a sectional end view illustrating the billet-withdrawing rollers.

Figure 5 is a detail view illustrating the means employed for holding the mould cap in position.

Figure 6 is a sectional view of the billet-supporting carriage.

In applying the invention to the continuous manufacture of cast steel billets by means of apparatus as shown in the drawings, I employ a rotary table $a$ supported by rollers $b$. At the centre of the table I mount a hollow vertical conduit $c$, herein termed the feeder, to which molten steel can be supplied from a ladle. The lower end of the feeder communicates with a plurality of radially disposed horizontal moulds $d$ carried on the table. Each mould is of tubular form and its internal cross section is shaped to correspond with that of the billets to be produced which may be of circular, polygonal or any other form. Also each mould is fitted at its outer end with a removable cap $e$ adapted when removed to expose a short length of the solidified metal in the mould, the cap being provided with an air vent $f$. Further a pair of rollers $g$ or other convenient means is provided at the outer end of each mould for gripping the exposed end of the metal and withdrawing it from the mould. The withdrawn metal is supported by a slidable carriage $h$ on the table, and during the rotation of the table (which is preferably intermittent but may be continuous) is subjected to the action of a rotary saw $21$, shears or burner flame for cutting it into the required lengths. Rotation of the table in the example illustrated is effected by an electric motor $i$ acting through reducing gear which drives a bevel pinion $k$ engaging a bevel wheel $l$ on the underside of the table.

The saw $21$ is journalled on an arm $22$ which is pivotally mounted on a carriage which is slidable on a superstructure situated above the table $a$. Any suitable hydraulic or other means may be provided for actuating the arm $22$ to move the saw $21$ into and out of its operative position in which its active peripheral portion passes through gaps $23$ in the side members of the carriage $h$ supporting the metal to be cut off. These gaps $23$ are of sufficient depth to enable the saw to pass completely through the metal, and are sufficiently wide to permit lateral movement of the saw during the cutting operation. This lateral movement of the saw is effected by sliding of the saw carriage on the said superstructure, and is necessary to enable the cutting operation to be performed since the metal being cut is being simultaneously subjected to longitudinal movement by the corresponding rollers $g$.

The number of moulds arranged on the table is such that the solidified metal can be withdrawn from each of the moulds concurrently at a rate which is compatible with the higher rate at which the molten metal is transferred from the ladle to the feeder. The molten metal must of necessity be supplied to the feeder quickly. But the rate at which the solidified metal can be withdrawn from the moulds must be slower on account of the time required for solidification. The number of moulds used is therefore such that the rate of withdrawal of the totality of solidified metal equals the rate of supply to the common feeder.

To ensure proper solidification of the metal in the moulds, each mould must not only be made of suitable length, but it is also desirable to provide means for maintaining a suitable temperature gradient along the mould. Throughout the whole or a large part of the length of the mould I arrange around its wall spiral conduits $m$, $n$, $o$, for water or other cooling medium. Starting from the inlet end adjacent to the feeder the convolutions of the conduit $m$ are spaced relatively widely apart and may be situated at a greater distance from the adjacent inner surface of the mould than the other conduits. In the convolutions of the conduit $n$ at the centre of the mould a smaller spacing is used so as to increase the rate of cooling at that part. Also this conduit may be situated nearer the inner surface of the mould. The spacing of the convolutions of the conduit $o$ is increased so as to lessen the cooling action near the outer end of the mould. In addition or as an alternative to the spiral conduits, I may provide suitably arranged air cooling fins on the exterior of the mould. Also if desired I may arrange a refractory lining $p$ at the inlet end of the mould. Preferably the part of the mould not occupied by the lining $p$ is fitted with a removable steel lining $q$.

The cap $e$ at the outer end of each mould is held in position during the initial filling of the mould, by a pair of abutments $r$ pivoted on the end of the adjacent carriage $h$. The weight of the cap is supported by rollers $s$ on the table. The carriage is supported by rollers $t$ on the table. Endwise movement of the carriage is effected by a hydraulically actuated plunger $u$ slidable in a cylinder $v$ which is carried on the table $a$. On the abutments $r$ above-mentioned are pivoted a pair of drag links 20 adapted to engage shoulders $y$ on the cap, these links being held in action by springs $z$.

When the cap is in position as shown in Figures 2 and 3, it is held on the mould by endwise pressure exerted by the plunger $u$ acting through the carriage $h$ and the abutments $r$. In this position the forward ends of the drag links 20 are at some distance away from the said shoulders $y$. To detach the cap the plunger is caused to retract the carriage, and during this movement the ends of the drag links will engage the shoulders, and continued operation of the plunger will pull the cap along the supporting rollers $s$ until it falls into the pit 2 in the table. The lost-motion shown in Figure 3 between the ends of the drag links and the shoulders $y$ is provided to allow sufficient movement of the carriage $h$ to clear the top of the pit. After the cap has been detached, the carriage $h$ is returned by the plunger to its initial position. Further the abutments $r$ and drag links 20 are swung aside to the positions shown by dotted lines in Figure 3.

After the end caps have been removed from the moulds, the ingot-gripping rollers are brought into action. Adjacent to the outer end of each mould are mounted a pair of laterally movable housings 4 situated on opposite sides of the mould and supported on rails 7 on the table by rollers 8. Each housing is movable laterally by a hydraulic plunger 5 slidable in a cylinder 6. Each roller $g$ is carried in its housing by a vertical shaft 9 which is connected to a horizontal driving shaft 10 by bevel wheels 11, 12, the wheel 12 being feather-keyed on the shaft 10. As will be seen in Figure 1 there are a plurality of shafts 10, and these are interconnected by bevel wheels 13, all the shafts being driven by an electric motor 14 through reduction gearing 15.

When starting up the apparatus, the end caps and the mechanism associated with the moulds are in the positions shown by Figures 2 and 3. After a sufficient quantity of metal has been poured into all the moulds through the feeder to fill the moulds, and when the portions of the metal occupying the end caps have become solidified, the end caps are withdrawn by outward movements of the carriages $h$ by the plungers $u$. The carriages $h$ are then returned, and the gripping rollers $g$ are simultaneously advanced on to the projecting ends of the metal by the plungers 5. Pouring of the metal into the feeder is continued, and the table is set in motion, causing the metal supported on each of the carriages to be conveyed in succession to the severing apparatus, where the table is intermittently stopped and portions of the metal are cut off by the saw 21 and discharged from the machine by a delivery carriage 24 which is slidable on a support situated at a position outside or beyond the periphery of the table. The machine remains in operation until the supply to the feeder is discontinued. In Figure 1, one of the moulds is shown with its end cap $e$ in position. Another mould is shown with the end cap removed to expose the portion of metal previously enclosed by the cap, the rollers $g$ being shown in engagement with this portion of the metal. Another mould is shown with the metal extending some distance therefrom under the action of the rollers.

Whilst I prefer to employ moulds carried on a rotary table as above described, the invention is not limited thereto. For example the arrangement shown in Figure 1 may be mounted on a stationary support or on the ground (instead of on a rotary table), in which case a saw and delivery carriage would be arranged adjacent to each mould. As an alternative to the radial arrangement I may employ a number of stationary horizontal moulds arranged parallel with each other, one end communicating with a common feeder.

The invention is principally intended for use in the continuous production of billets required in the manufacture of tubes, or for subsequent rolling into bars or the like of any desired cross section, and whilst it is especially adapted for the casting of steel billets, bars or the like, any other metal may be used.

The invention is not limited to the particular examples above specified, as subordinate details may be varied to suit different requirements.

Having thus described my invention what I claim as new and desire to secure by Letters Patent is:—

1. Apparatus for the continuous manufacture of steel or other metal billets, bars or the like, comprising the combination of a plurality of horizontal moulds, a hollow conduit communicating at one end with the moulds and adapted to serve as a feeder through which molten metal can be continuously supplied to all of the moulds, removable caps for temporarily closing the delivery ends of the moulds while molten metal is being supplied to the moulds and until the metal in the delivery ends of the moulds has solidified, reciprocatory carriages for supporting the solidified metal withdrawn from the moulds, means associated with the carriages whereby the caps are held in and removed from their operative positions, and means adapted to withdraw the metal from the moulds by acting on the solidified metal exposed when the caps are removed from their operative positions.

2. Apparatus as claimed in claim 1 and comprising pivotal abutments on the carriages whereby the caps for closing the delivery ends of the moulds are held in their operative positions, and drag links pivoted on the abutments for removing the said caps from their operative positions.

3. Apparatus for the continuous manufacture of steel or other metal billets, bars or the like, comprising the combination of a rotary horizontal table, a hollow conduit for receiving molten metal arranged at the centre of the table, a plurality of radially disposed horizontal moulds carried on the table and communicating at their inner ends with the lower end of the said conduit, removable caps for temporarily closing the outer ends of the moulds while molten metal is being supplied through the said conduit to the moulds and until the metal in the outer ends of the moulds has solidified, means adapted to withdraw the metal from the moulds by acting on the solidified metal exposed when the caps are removed from their operative positions, reciprocatory carriages for supporting the solidified metal withdrawn from the moulds, means associated with the carriages whereby the caps for closing the outer ends of the moulds are held in and removed from their operative positions, pits in the table for receiving the removed caps, and hydraulically operated means for actuating the carriages.

4. Apparatus for the continuous manufacture of steel or other metal billets, bars or the like, comprising the combination of a rotary horizontal table, a hollow vertical conduit for receiving molten metal arranged at the centre of the table, a plurality of radially disposed horizontal moulds carried on the table and communicating at their inner ends with the lower end of the said conduit, removable caps for temporarily closing the outer ends of the moulds while molten metal is being supplied through the said conduit to the moulds and until the metal in the outer ends of the moulds has solidified, means whereby the caps are held in and removed from their operative positions, gripping means mounted on the table and adapted to withdraw the metal from the moulds by acting on the solidified metal exposed when the caps are removed, and cutting means arranged to act in sequence on the metal withdrawn from each of the moulds.

5. Apparatus for the continuous manufacture of steel or other metal billets, bars or the like, comprising the combination of a rotary horizontal table, a hollow vertical conduit for receiving molten metal arranged at the centre of the table, a plurality of radially disposed horizontal moulds carried on the table and communicating at their inner ends with the lower end of the said conduit, removable caps for temporarily closing the outer ends of the moulds while molten metal is being supplied through the said conduit to the moulds and until the metal in the outer ends of the moulds has solidified, means whereby the caps are held in and removed from their operative positions, gripping means mounted on the table and adapted to withdraw the metal from the moulds by acting on the solidified metal exposed when the caps are removed, reciprocatory carriages on the table for supporting the solidified metal withdrawn from the moulds, and cutting means arranged to act in sequence on the metal supported by each of the carriers.

6. Apparatus for the continuous manufacture of steel or other metal billets, bars or the like, comprising the combination of a rotary horizontal table, a hollow vertical conduit for receiving molten metal arranged at the centre of the table, a plurality of radially disposed horizontal moulds carried on the table and communicating at their inner ends with the lower end of the said conduit, helical cooling conduits for maintaining temperature gradients along the moulds, the convolutions of the said cooling conduits being differentially spaced so that they are closer together near the centre portion of each mould, removable caps for temporarily closing the outer ends of the moulds while molten metal is being supplied through the said conduit to the moulds and until the metal in the outer ends of the moulds has solidified, means whereby the caps are held in and removed from their operative positions, gripping means on the table and adapted to withdraw the metal from the moulds by acting on the solidified metal exposed when the caps are removed, and cutting means arranged to act in sequence on the metal withdrawn from each of the moulds.

WILLIAM CHARLES BELL.